(12) United States Patent
Bhide et al.

(10) Patent No.: US 8,434,008 B2
(45) Date of Patent: Apr. 30, 2013

(54) INTEGRATING INFORMATION SOURCES

(75) Inventors: Manish A. Bhide, New Delhi (IN); Ajay Gupta, New Delhi (IN); Mukesh K. Mohania, Agra (IN); Rajesh V. Patil, Maharashtra (IN)

(73) Assignee: International Business Machines Corporation, Armonk, NY (US)

( * ) Notice: Subject to any disclaimer, the term of this patent is extended or adjusted under 35 U.S.C. 154(b) by 872 days.

(21) Appl. No.: 12/424,911

(22) Filed: Apr. 16, 2009

(65) Prior Publication Data

US 2010/0269071 A1 Oct. 21, 2010

(51) Int. Cl.
*G06F 3/00* (2006.01)

(52) U.S. Cl.
USPC ............................ 715/752; 715/753; 715/963

(58) Field of Classification Search ................... 715/751, 715/758, 846
See application file for complete search history.

(56) References Cited

U.S. PATENT DOCUMENTS

| | | | |
|---|---|---|---|
| 5,842,009 A | 11/1998 | Borovoy et al. | |
| 5,943,652 A * | 8/1999 | Sisley et al. | 705/7.25 |
| 6,604,079 B1 | 8/2003 | Ruvolo et al. | |
| 7,225,187 B2 | 5/2007 | Dumais et al. | |
| 7,490,289 B2 * | 2/2009 | Hintermeister et al. | 715/234 |
| 2006/0026499 A1 * | 2/2006 | Weddle | 715/503 |
| 2006/0031197 A1 | 2/2006 | Oral et al. | |
| 2008/0021898 A1 | 1/2008 | Hoglund | |
| 2008/0228795 A1 * | 9/2008 | Lomet | 707/101 |
| 2009/0247134 A1 * | 10/2009 | Jeide et al. | 455/414.2 |
| 2010/0153162 A1 * | 6/2010 | Tam et al. | 715/733 |
| 2010/0269049 A1 * | 10/2010 | Fearon | 715/752 |

OTHER PUBLICATIONS

"REMAIL: Reinventing Email: Collaborative User Experience Group," [online] IBM Research [retrieved Apr. 16, 2009] retrieved from the Internet: <http://www.research.ibm.com/remail/chat.html>.

* cited by examiner

*Primary Examiner* — Weilun Lo
*Assistant Examiner* — Truc Chuong
(74) *Attorney, Agent, or Firm* — Patents on Demand P.A.; Brian K. Buchheit; Scott M. Garrett (57) ABSTRACT

Disclosed is a method and system for integrating heterogeneous fragments of information from at least two collaboration channels, using one or more servers, each adapted to provide fragments from one collaboration channel; one or more adapters, each adapted to adapt a fragment provided by a corresponding server to an interface common to the collaboration channels; and a module adapted to: find a previously stored fragment related to a new adapted fragment, and create a link between the related fragment and the new fragment; and one or more repositories, each adapted to store an adapted fragment from a corresponding server. Other embodiments are also disclosed.

19 Claims, 4 Drawing Sheets

INTEGRATING INFORMATION SOURCES

BACKGROUND

Contemporary knowledge workers increasingly carry out their duties collaboratively, using shared electronic information. Examples of sources or "collaboration channels" in which information is originated and exchanged include electronic mail, electronic diaries or "calendars", and live "chat" sessions. In electronic mail (hereafter simply "mail"), a user composes a mail message and forwards it to one or more recipients for their perusal at a later time. In live chat, two or more participants compose short text messages and exchange them in real time, resulting in a session transcript. An electronic calendar allows a user to set up a meeting with certain details about time, place, and content, and send entries including the meeting details to other users. The calendar entry typically appears as a block of time in a graphical representation of the recipient's daily schedule. All information generated by such collaboration channels may be saved for later search and retrieval by one or more users.

A typical workflow often involves multiple collaboration channels. For example, one worker sends a mail message to another suggesting a meeting be arranged and giving some details of the topic. The recipient then arranges the meeting and sends a calendar entry to the first worker. After the meeting, the participants conduct a chat session continuing the meeting discussion. The workflow now includes heterogeneous information fragments originating from three collaboration channels.

It is therefore desirable to be able to integrate or link together the heterogeneous fragments of information from different channels so as to be able to review the entire workflow. In conventional system, as described in the example above, the recipient would be able to link the original mail with the calendar entry, and the calendar entry with the subsequent chat session transcript. However, the typical knowledge worker, particularly one in a more senior position of responsibility, participates in multiple such workflows concurrently, each involving the generation and circulation of information fragments in multiple collaboration channels. Linking heterogeneous collaborative information fragments to a common workflow rapidly becomes a tiresome and laborious, and possibly error-prone, task. Unless the worker is an unusually well organized individual, there is a high risk that a fragment of collaborative information will go astray, either remaining unlinked or being linked to the wrong workflow.

BRIEF SUMMARY

According to a first aspect of the embodiments of the invention disclosed herein, there is provided a method of integrating heterogeneous fragments of information from at least two collaboration channels for adapting a new fragment to an interface common to the collaboration channels; obtaining, via the common interface, additional information about the new fragment; finding a previously stored fragment that is related to the new fragment using the additional information; creating a link between the related fragment and the new fragment; and storing the new fragment in a repository.

According to a second aspect of the embodiments of the invention disclosed herein, there is provided a system for integrating heterogeneous fragments of information from at least two collaboration channels having one or more servers, each adapted to provide fragments from one collaboration channel; one or more adapters, each adapted to adapt a fragment provided by a corresponding server to an interface common to the collaboration channels; and a module adapted to find a previously stored fragment related to a new adapted fragment, and create a link between the related fragment and the new fragment; and one or more repositories, each adapted to store an adapted fragment from a corresponding server.

According to further aspect of the embodiment of the invention disclosed herein, there is provided a computer program product including a computer readable medium having recorded thereon a computer program for implementing any one of the methods described above. Other aspects are also disclosed.

BRIEF DESCRIPTION OF THE SEVERAL VIEWS OF THE DRAWINGS

One or more embodiments of the invention will now be described with reference to the drawings, in which.

DETAILED DESCRIPTION

Where reference is made in any one or more of the accompanying drawings to steps and/or features, which have the same reference numerals, those steps and/or features have for the purposes of this description the same function(s) or operation(s), unless the contrary intention appears.

The present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium. In one embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. Examples of a computer-readable medium include a semiconductor or solid state memory, magnetic tape, a removable computer diskette, a random access memory (RAM), a read-only memory (ROM), an erasable programmable read-only memory (EPROM or Flash memory, a rigid magnetic disk and an optical disk. Current examples of optical disks include compact disk-read only memory (CD-ROM), compact disk-read/write (CD-R/W) and DVD. Other computer-readable medium can include a transmission media, such as those supporting the Internet, an intranet, a personal area network (PAN), or a magnetic storage device. Transmission media can include an electrical connection having one or more wires, an optical fiber, an optical storage device, and a defined segment of the electromagnet spectrum through which digitally encoded content is wirelessly conveyed using a carrier wave.

Note that the computer-usable or computer-readable medium can even include paper or another suitable medium upon which the program is printed, as the program can be electronically captured, for instance, via optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Embodiments of the invention disclose an exemplary system for integrating collaboration channels such as mail, calendar, and live chat by finding relations between heterogeneous fragments of collaborative information based on the content and contextual attributes of the fragments. The resulting groups of related fragments correspond to workflows involving multiple collaboration channels, without the need for intervention by the user.

Figure 1:
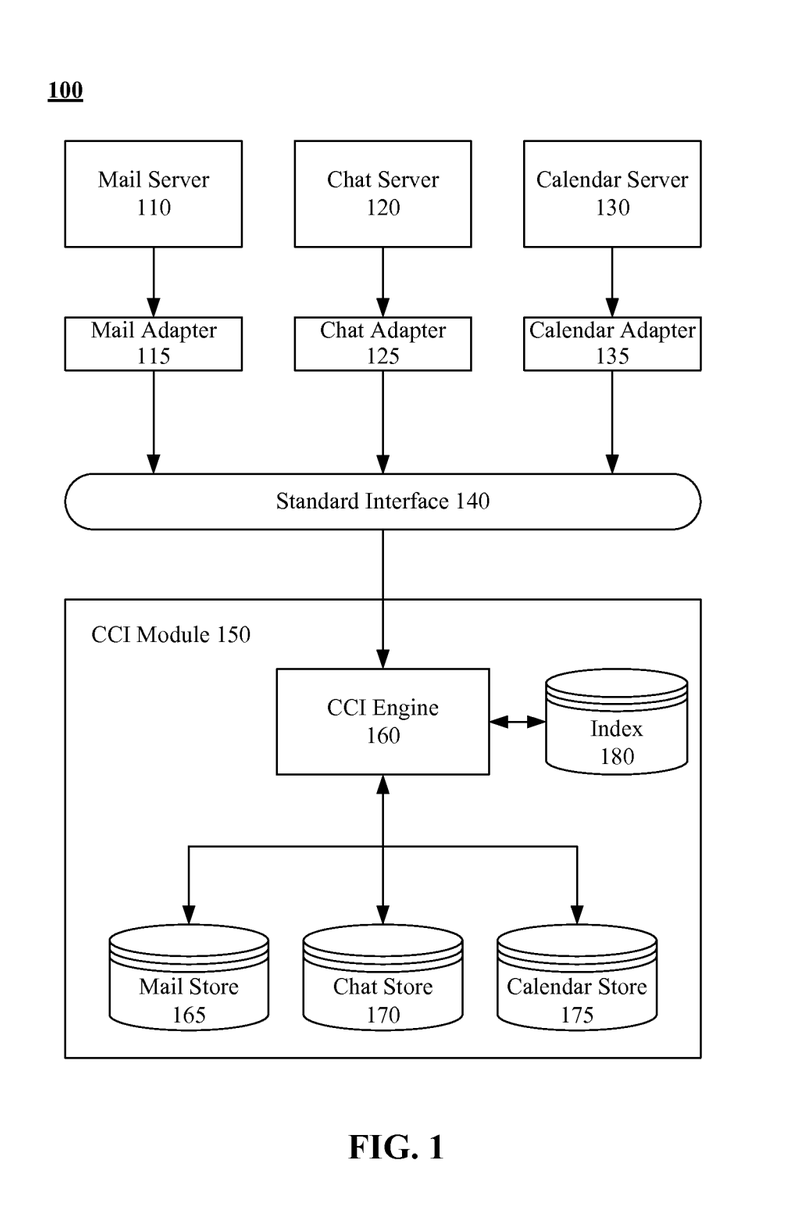
FIG. 1 shows an exemplary embodiment of a system for integrating collaboration channels.

FIG. 1 shows an exemplary embodiment of a system 100 for integrating collaboration channels. The system 100 as illustrated includes servers 110, 120, and 130 for three different collaboration channels: mail, chat, and calendar respectively. It should be obvious to one skilled in the art that the system 100 is not limited to these three collaboration channels, which are merely chosen to illustrate an exemplary embodiment, and that various other collaboration channels may be integrated in analogous fashion to these three channels illustrated in FIG. 1.

The system 100 includes a "Collaboration Channel Integration" (CCI) module 150, which interfaces with each server 110, 120, and 130 via respective adapters 115, 125, and 135 using a common standard interface 140. The CCI module 150 is implemented within a client application corresponding to one of the collaboration channels, for example a mail client application. The adapters 115, 125, and 135 may also be implemented within the client application, though as an alternative they may be implemented on the corresponding server 110, 120, or 130.

The CCI module 150 has a CCI engine 160 that interfaces with four repositories: a mail store 165, a chat store 170, a calendar store 175, and an index 180. The repositories 165, 170, and 175 may be databases or any other structured or unstructured data source. Again, it should be obvious to a skilled person that the four repositories server only an illustrative purpose and there could be more than four repositories in the system, configured differently, to achieve the functionality described above.

Figure 2:
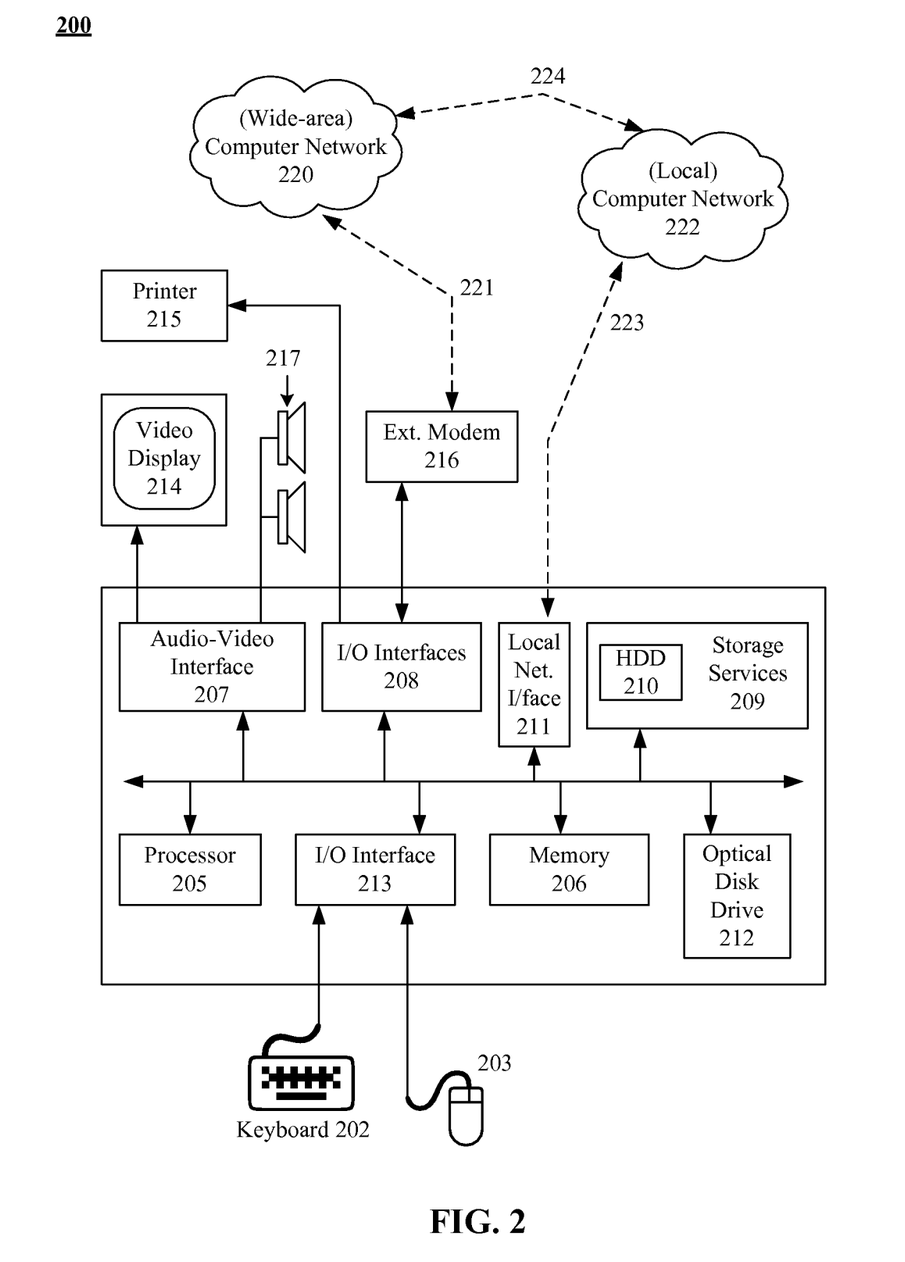
FIG. 2 is a schematic block diagram of an exemplary embodiment of a general purpose computer upon which embodiments of the invention may be practiced.

The modules 115, 125, 135, and 160 of the system 100 of FIG. 1 may be implemented using a computer system 200, such as that shown in FIG. 2. In one embodiment, these modules may be implemented as software executable within the computer system 200. In particular, the modules are effected by instructions in the software that are carried out within the computer system 200. The modules may be implemented as one or more code modules, each for performing one or more particular tasks pertaining to the corresponding module.

The client application mentioned above may thus be divided into two separate parts, in which a first part performs the tasks pertaining to the modules 115, 125, 135, and 160, in addition to other processing tasks, and a second part manages a user interface between the first part and a user. The application software may be stored in a computer readable medium or a program storage device, where the two are used interchangeably. The software is loaded into the computer system 200 from the computer readable medium, and then executed by the computer system 200. A computer readable medium having such software or computer program recorded on it is a computer program product. The use of the computer program product in the computer system 200 preferably effects an apparatus, system, or device for integrating collaborative information channels.

As illustrated in FIG. 2, the computer system 200 is formed by a computer module 201, input devices such as a keyboard 202 and a mouse pointer device 203, and output devices including a printer 215, a display device 214 and loudspeakers 217. An external Modulator-Demodulator (Modem) transceiver device 216 may be used by the computer module 201 for communicating to and from a communications network 220 via a connection 221. The network 220 may be a wide-area network (WAN), such as the Internet or a private WAN. Where the connection 221 is a telephone line, the modem 216 may be a traditional "dial-up" modem. Alternatively, where the connection 221 is a high capacity (e.g., cable) connection, the modem 216 may be a broadband modem. A wireless modem may also be used for wireless connection to the network 220.

The computer module 201 typically includes at least one processor unit 205, and a memory unit 206, the memory for example formed from semiconductor random access memory (RAM) and read only memory (ROM). The module 201 also includes an number of input/output (I/O) interfaces including an audio-video interface 207 that couples to the video display 214 and loudspeakers 217, an I/O interface 213 for the keyboard 202 and mouse 203 and optionally a joystick (not illustrated), and an interface 208 for the external modem 216 and printer 215. In some implementations, the modem 216 may be incorporated within the computer module 201, for example within the interface 208. The computer module 201 also has a local network interface 211 which, via a connection 223, permits coupling of the computer system 200 to a local computer network 222, known as a Local Area Network (LAN). As also illustrated, the local network 222 may also couple to the wide network 220 via a connection 224, which would typically include a so-called "firewall" device or similar functionality. The interface 211 may be formed by an Ethernet™ circuit card, a wireless Bluetooth™ or an IEEE 802.11 wireless arrangement.

The interfaces 208 and 213 may afford both serial and parallel connectivity, the former typically being implemented according to the Universal Serial Bus (USB) standards and having corresponding USB connectors (not illustrated). Storage devices 209 (program storage device or computer readable medium) are provided and typically include a hard disk drive (HDD) 210. Other devices such as a floppy disk drive and a magnetic tape drive (not illustrated) may also be used. An optical disk drive 212 is typically provided to act as a non-volatile source of data. Portable memory devices, such optical disks (e.g., CD-ROM, DVD), USB-RAM, and floppy disks for example may then be used as appropriate sources of data to the system 200. It should be obvious to a person skilled in the art that various forms of storage devices may be used to enable embodiments of the invention.

The components 205 to 213 of the computer module 201 typically communicate via an interconnected bus 204 and in a manner that results in a conventional mode of operation of the computer system 200 known to those in the relevant art. Examples of computers on which the described arrangements can be practiced include IBM-PC's and compatibles, Sun Sparcstations, Apple Mac™ or like computer systems evolved therefrom.

Typically, the modules discussed above are resident on the hard disk drive 210 and are read and controlled in execution by the processor 205. Intermediate storage used by such modules, the repositories 165, 170, and 175, the index 180, and any data fetched from the networks 220 and 222 may be accomplished using the semiconductor memory 206, possibly in concert with the hard disk drive 210. In some instances, the application software may be supplied to the user encoded on one or more CD-ROM and read via the corresponding drive 212, or alternatively may be read by the user from the networks 220 or 222.

Still further, the software can also be loaded into the computer system 200 from other computer readable media. Computer readable media refers to any storage medium that participates in providing instructions and/or data to the computer system 200 for execution and/or processing. Examples of such media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 201. Examples of computer readable transmission media that may also participate in the provision of instructions and/or data include radio or infrared transmission channels as well as a network connection to another computer or networked device, and the Internet or Intranets including e-mail transmissions and information recorded on Websites and the like.

The second part of the application software mentioned above may be executed to implement one or more graphical user interfaces (GUIs) to be rendered or otherwise represented upon the display 214. Through manipulation of the keyboard 202 and the mouse 203, a user of the computer system 200 and the application may manipulate the interface to provide controlling commands and/or input to the applications associated with the GUI(s).

The modules 115, 125, 135, and 160 of FIG. 1 may alternatively be implemented in dedicated hardware such as one or more circuits, for example integrated circuits, performing the functions or sub functions of the corresponding modules. Such dedicated hardware may include digital signal processors, or one or more microprocessors and associated memories.

Figure 3:
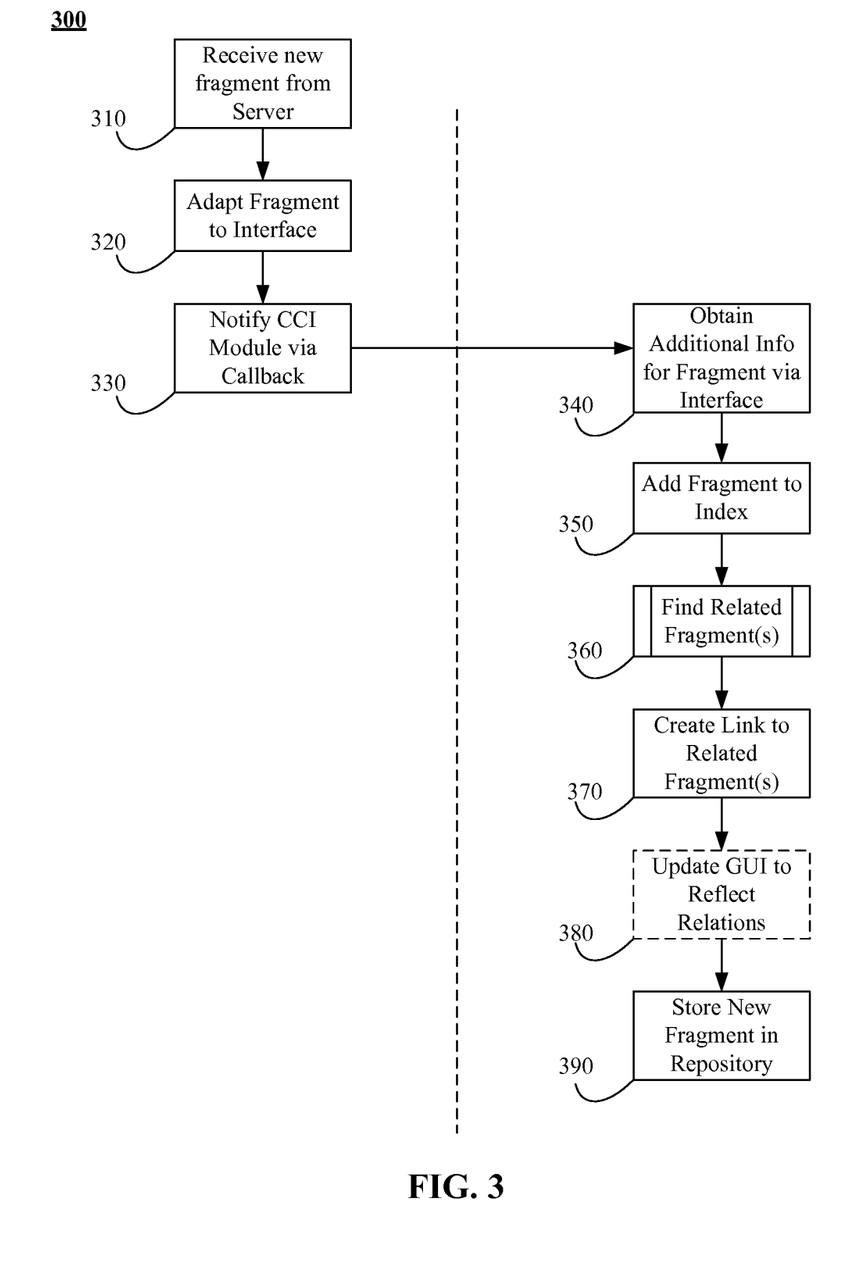
FIG. 3 is an exemplary embodiment of a flow diagram of a method of integrating collaboration channels.

FIG. 3 illustrates an exemplary embodiment of a flow diagram of a method 300 of integrating collaboration channels. The method 300 is carried out by the system 100 of FIG. 1. The vertical line 305 divides the steps of the method 300 between those carried out by an adapter 115, 125, or 135 (on the left) and those carried out by the CCI module 150 (on the right).

On receiving (310) a new fragment of collaborative data, i.e. a new mail message, a new chat session transcript, or a new calendar entry, from the server 110, 120, or 130 respectively, the corresponding adapter 115, 125, or 135 adapts (320) the fragment to conform to the standard interface 140, and notifies (330) the CCI module 150 via a callback method of the interface 140. The interface 140 abstracts the key data of the fragment from the different representations of fragments originating from different servers 110-130.

The use of the callback method in the interface 140 allows the CCI module 150 to respond to fragments which have not been opened by the user. For example, when the new fragment is a mail message, the callback method is invoked regardless of whether the user has opened the mail message. The CCI module 150 responds to the notification of the mail message by executing the steps described below, potentially linking it with other received fragments. Hence, the CCI module 150 is able to respond to opened fragments as well as unopened fragments.

Once the callback method is invoked, the CCI module 150 uses the interface 140 to obtain (340) additional information about the fragment, identified by its identifier fragmentID. The interface 140 includes methods for this purpose such as:
getFragmentText(fragmentID): This method returns the text body of the fragment.
getFragmentUserNames(fragmentID): This method returns the name(s) of the users associated with the fragment; e.g. if the fragment is a new mail message, then this method returns the names of the users who are listed in the TO, CC, and BCC fields of the message. If the fragment is a chat session transcript, this method returns the names of the users participating in the chat session. If the fragment is a calendar entry, the method returns the names of the users invited to the meeting.
getFragmentContext(fragmentID): This method returns the entire context of the fragment. The contextual attributes can include mail message subject, calendar entry time, calendar entry venue, etc.

The index 180 cross-references keywords to fragments stored in the three repositories 165, 170, and 175. That is, given a keyword, the index 180 returns the identifiers of zero or more fragments containing that keyword in the three repositories 165, 170, and 175. The index 180 is accumulated by the repeated execution of step 350 by the CCI engine 160 in response to each new fragment. In the step 350, the CCI engine 160 examines the text body and the contextual attributes of the new fragment (such as subject, header information etc.), obtained using the getFragmentText and getFragmentContext methods described above, to identify one or more keywords of the fragment using a technique known as Inverse Document Frequency (IDF). The IDF is a measure to compute the importance of a word. A word that occurs rarely has a high IDF value whereas a word that occurs very frequently (such as "is", "the") has a low IDF value. The IDF of the word t is computed as follows:

$$IDF(t) = 1 + \log\left(\left|\frac{|F|}{|F'|}\right|\right)$$

where |F| is the total number of fragments observed thus far and |F'| is the number of fragments that have the word "t" in it. A keyword is a word with an IDF value higher than a predetermined threshold. The CCI engine 160 then stores the fragment identifier fragment ID against the keyword(s) in the index 180.

In response to a new fragment, the CCI engine 160 executes a context-based process 360 to find and mark fragments stored in the repositories 165, 170, and 175 that are related to the new fragment. The context-based process 360 makes use of various contextual attributes of the new fragment, such as subject, date, user names, etc, obtained at step 340 as part of the "additional information". The CCI module 150 then creates a link (370) between the new fragment and any stored fragment(s) marked as related to the new fragment. The application of which the CCI module 150 forms part then optionally updates (380) the GUI of the client application to reflect the discovered relations(s), as described below. Finally, the CCI module 150 stores (390) the new fragment in the repository 165, 170, or 175 corresponding to the type of the new fragment. Step 390 can occur at any time after the step 330.

Figure 4:
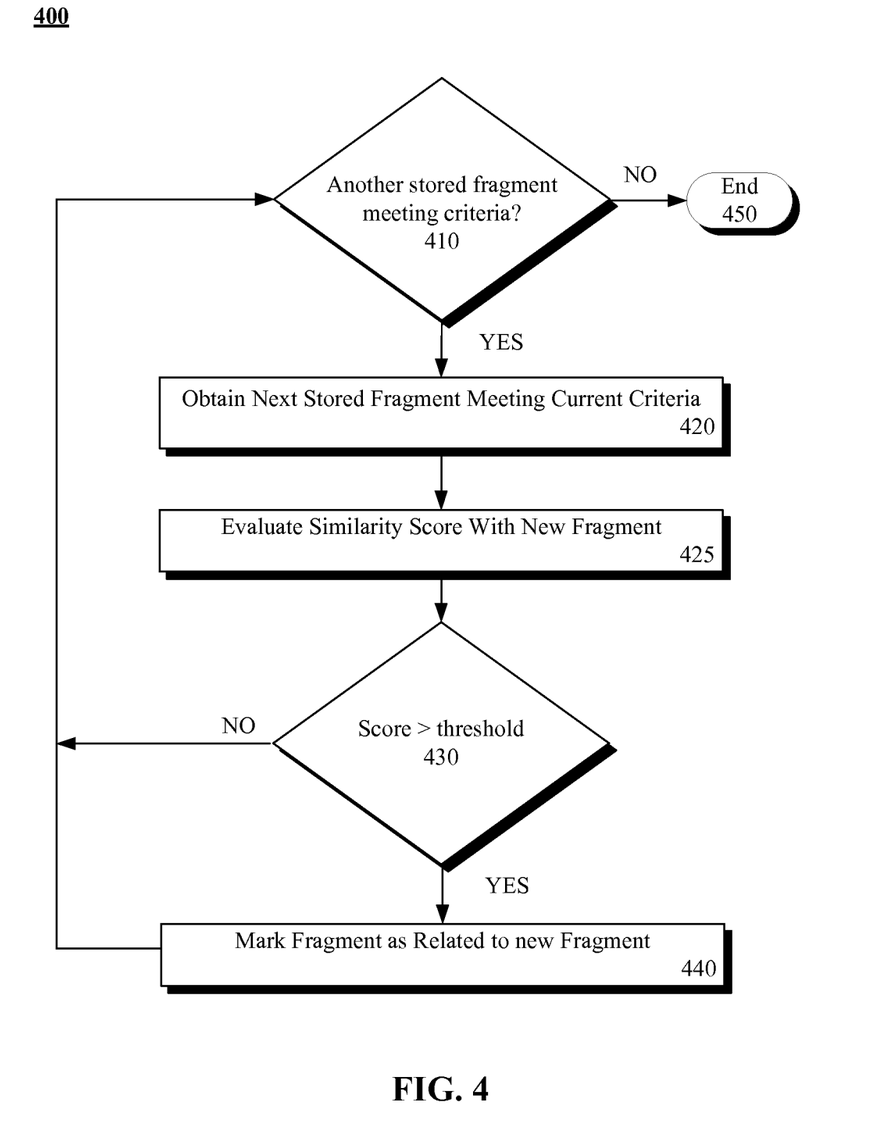
FIG. 4 is an exemplary embodiment of a flow diagram of a method of finding related fragments.

FIG. 4 illustrates an exemplary embodiment of a flow diagram of a method 400 of finding related fragments that is used by default in the context-based process 360 of FIG. 3. The CCI engine 160 first (410) determines whether there is another stored fragment in the repositories 165, 170, and 175 that meets the current criteria (by default, the criteria are null, so any stored fragment meets them). If there is no such stored fragment, the method 400 ends (450). Otherwise, the CCI engine 160 obtains (420) the stored fragment and evaluates (425) the similarity with the new fragment. The step 425 uses a scoring function, described below, that, given two fragments, finds the similarity between them. The CCI engine 160 then determines (430) whether the similarity score between the new fragment and the stored fragment is above a predetermined threshold. If so, the stored fragment is marked (440) as related to the new fragment. If not, or after step 440, the CCI engine 160 returns to step 410.

The similarity scoring function used at step 425 comprises various rules for evaluating similarity, which are invoked depending on the type of each fragment (mail message, calendar entry, chat session transcript).

1) Subject-based similarity: The subjects of the two fragments are compared. (Note that if either fragment is a chat session transcript, this rule is not invoked as a chat session transcript does not have a designated "subject" attribute). If the subjects match, then a high similarity score results.

2) Content-based similarity: This rule uses the keyword(s) of the new fragment, extracted at step 350 using the IDF technique as described above. If the stored fragment under comparison is listed in the index 180 against the keyword(s), the similarity score is high; otherwise, it is low. If the new fragment is a chat session transcript, a high similarity score is adjusted upwards depending on how early in the text body of the chat session transcript the extracted keyword(s) appear. The earlier the keyword appears, the greater is the adjustment. This is because the true "subject" of a chat session is most likely to appear in the first few message exchanges of the session transcript.

3) Enhanced User List-based similarity: This rule makes use of the lists of names of the users associated with each fragment (the recipients of a mail message, the invitees of a calendar entry, or the participants in a chat session). The similarity score depends on the degree of overlap between the lists of users. If the lists of users match exactly, the similarity score is high. If the two lists of users match partially, for example if the users of the first fragment are U1 and U2 whereas the users of the second fragment are U1, U2 and U3, the scoring function checks whether U3's name/short name/first name is present in the body of the first fragment. If yes, the score is high, but lower than if the lists match exactly. The reason is that often a fragment is generated whose body contains words to the effect of "arrange a meeting and include U3 in it as well". A subsequent calendar entry with U1, U2, and U3 as associated users is likely to be related to the fragment.

In a special case where a new fragment is a calendar entry, a technique called "chain discovery" is used as the process 360 to find related fragments. Generally, a meeting is set up after a mail exchange has happened between two or more users, which may continue after the meeting has taken place. Hence, chain discovery begins by using the method 400 to find the earliest mail message related to, and sent before, the calendar entry. The "current criteria" used in step 410 are therefore set to obtain mail messages with send date before the arrival of the calendar entry.

The earliest prior or previous mail message marked as related to the new calendar entry becomes the "root" mail message. To find later stored mail messages related to the new calendar entry, the "current criteria" are set to obtain mail messages sent later than the root mail message, and the method 400 is carried out again, with one difference: step 425 evaluates similarity of obtained mail messages with the root mail message rather than the original calendar entry. Later or subsequent mail messages sufficiently similar to the root mail message are marked (440) as related to the original calendar entry. For example, assume mail messages E1, E2 and E3 (with that time order) are related to new calendar entry C1. Chain discovery first finds the relation between C1 and E1 and designates E1 as the root mail message. Because of the evolving nature of mail exchanges, E2 and E3 are more likely to be similar to E1 than to C1. Hence, chain discovery, by looking for later mail messages similar to E1, is more likely to locate E2 and E3 than looking for later mail messages similar to C1.

The method 300 may be executed periodically on all fragments received since the last execution, rather than in response to each new fragment as described above. In this "pull"-based alternative, the CCI engine 160 periodically (e.g. every minute) polls the servers 110, 120 and 130 to find any new fragments that have arrived since the last poll. The corresponding adapter 115, 125, or 135 and the CCI engine 160 then perform the method 300 on each new fragment, with one modification: step 330 is not executed. Step 330 uses the callback method of the interface 140 to "push" the new fragment to the CCI engine 160 as soon as it arrives (e.g., when a new mail message arrives, the CCI engine 160 is notified using the callback method), hence the unmodified method 300 is a "push"-based technique.

At the step 380, the graphical user interface (GUI) of the application of which the CCI module 150 forms part is updated to reflect the discovered relation(s) between collaborative information fragments. According to one embodiment, the relation is shown in the form of an icon alongside an item representing the new fragment in the user's inbox. For example, according to this embodiment, a user U1 has a mail message exchange with a user U2, in which they decide that U2 will set up a follow-up meeting. When U1 sees a an item representing new calendar entry from U2, even before opening the calendar entry, U1 can infer from a flag rendered alongside the item in the inbox view portion of the calendar application GUI that the calendar entry is related to the mail message exchange. This embodiment is useful to show related calendar entries and mail messages in a format similar to the "mail threads" view in Lotus Notes™.

If a mail message and a calendar entry are related, then an "active" icon rather than a flag may be rendered beside the item representing the mail message in the GUI of the mail application to reflect the fact that there is a related calendar entry for the mail message. If the user activates the active icon using the mouse 303 or other pointing device, the related calendar entry is opened by the calendar application. If there are multiple related entries, then a summary of the related entries is displayed to the user on activation of the active icon.

In other embodiments, there are different icons for indicating related mail messages, calendar entries and chat session transcripts. Activating each icon would invoke the correct application to open the corresponding related fragments.

The diagrams in FIGS. 1-4 illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The description set out above describes particular embodiments only and is not intended to limit the invention, whose scope is determined solely by the claims set out below. As used here, singular forms "a", "an" and "the" are intended to include plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method of integrating heterogeneous fragments of information from at least two collaboration channels, the method comprising:

adapting a new fragment to an interface common to the collaboration channels, wherein the new fragment corresponds to a first collaboration channel of the at least two collaboration channels;

obtaining, via the common interface, additional information about the new fragment;

finding a previously stored fragment related to the new fragment using the additional information, wherein the previously stored segment corresponds to a second collaboration channel of the at least two collaboration channels and the new fragment and the previously stored fragment are the heterogeneous fragments of information, wherein said finding further comprises:

obtaining a previously stored fragment;

evaluating a similarity between the stored fragment and the new fragment using the additional information; and marking, if the similarity is greater than a predetermined threshold, the stored fragment as being related to the new fragment;

creating a link between the related fragment and the new fragment; and storing the new fragment in a repository.

2. The method of claim 1, further comprising:

updating a graphical user interface associated with the new fragment reflecting a relation between the new fragment and the stored fragment.

3. The method of claim 2, wherein the step of updating comprises rendering, on the graphical user interface, an icon alongside an item representing the new fragment.

4. The method of claim 3, wherein the icon is a flag, and the icon is an active Icon.

5. The method of claim 4, further comprising:

opening the related fragment stored by a corresponding application in response to activation of the active icon.

6. The method of claim 1, wherein the new fragment is a calendar entry, and the step of obtaining is configured to obtain mail messages with a send date prior to an arrival of the calendar entry.

7. The method of claim 6, further comprising:

repeating the steps of obtaining, evaluating, and marking, wherein the similarity is evaluated between the stored fragment and an earliest mail message found to be related to the calendar entry, and the obtaining step configured to obtain mail messages with a send date later than the send date of the earliest related mail message.

8. The method of claim 1, wherein the additional information comprises a subject of the new fragment.

9. The method of claim 1, wherein the additional information comprises a keyword of the new fragment.

10. The method of claim 9, further comprising adjusting the similarity depending on how early in the new fragment the keyword appears.

11. The method of claim 1, wherein the additional information comprises a user list of the new fragment.

12. The method of claim 11, further comprising adjusting the similarity upwards if an unmatched user in the user list of one fragment appears in the text body of the other fragment.

13. The method of claim 1, wherein the collaboration channels comprise at least two of: electronic mail, calendar, and live chat.

14. A system for integrating heterogeneous fragments of information from at least two collaboration channels, the system comprising:

one or more servers, each adapted to provide fragments from one collaboration channel;

one or more adapters, each adapted to adapt a fragment provided by a corresponding server to an interface common to the collaboration channels; and a module adapted to:

find a previously stored fragment related to a new adapted fragment, and create a link between the related fragment and the new fragment, wherein the new fragment corresponds to a first collaboration channel and the previously stored segment corresponds to a second collaboration channel of the at least two collaboration channels, wherein said module is further adapted to find the previously stored fragment by:

obtaining a previously stored fragment;

evaluating a similarity between the stored fragment and the new fragment using the additional information; and marking, if the similarity is greater than a predetermined threshold, the stored fragment as being related to the new fragment, wherein the new fragment and the previously stored fragment are the heterogeneous fragments of information; and one or more repositories, each adapted to store an adapted fragment from a corresponding server.

15. The system of claim 14, wherein a graphical user interface is adapted to reflect the relations between the previously stored fragments and the new fragment.

16. The system of claim 14, wherein the adapter is further configured to notify the module of the provision of a new fragment.

17. The system of claim 14, wherein the module is further configured to:

periodically poll the one or more servers to find any newly provided fragments; and cause the adapter to adapt any new fragments to the common interface, before finding the previously stored fragment related to the new adapted fragment, and creating the link between the related fragment and the new fragment.

18. The system of claim 14, wherein the module is further configured to obtain, via the common interface, additional information about the new fragment, wherein finding the previously stored fragment uses the additional information.

19. A non-transitory storage medium embodying a program of machine-readable instructions for integrating heterogeneous fragments of information from at least two collaboration channels, the program executable by a digital processing apparatus configured for:

adapting a new fragment to an interface common to the collaboration channels, wherein the new fragment corresponds to a first collaboration channel of the at least two collaboration channels;

obtaining, via the common interface, additional information about the new fragment;

finding a previously stored fragment related to the new fragment using the additional information; wherein the previously stored segment corresponds to a second collaboration channel of the at least two collaboration channels and the new fragment and the previously stored fragment are the heterogeneous fragments of information, wherein said finding further comprises:

obtaining a previously stored fragment;

evaluating a similarity between the stored fragment and the new fragment using the additional information; and marking, if the similarity is greater than a predetermined threshold, the stored fragment as being related to the new fragment;

creating a link between the related fragment and the new fragment; and storing the new fragment in a repository.

* * * * *